(12) United States Patent
Riviello et al.

(10) Patent No.: US 12,418,531 B2
(45) Date of Patent: Sep. 16, 2025

(54) SYSTEMS AND METHODS FOR ON-NETWORK DEVICE IDENTIFICATION

(71) Applicant: Comcast Cable Communications, LLC, Philadelphia, PA (US)

(72) Inventors: John Riviello, Voorhees, NJ (US); Christopher Lorenzo, Philadelphia, PA (US); Max Knee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/460,431

(22) Filed: Sep. 1, 2023

(65) Prior Publication Data

US 2023/0412600 A1    Dec. 21, 2023

Related U.S. Application Data

(63) Continuation of application No. 17/647,609, filed on Jan. 11, 2022, now Pat. No. 11,750,613, which is a continuation of application No. 16/046,804, filed on Jul. 26, 2018, now Pat. No. 11,252,155.

(51) Int. Cl.
*H04L 9/40* (2022.01)
*H04L 61/5007* (2022.01)

(52) U.S. Cl.
CPC .......... *H04L 63/10* (2013.01); *H04L 61/5007* (2022.05)

(58) Field of Classification Search
CPC .... H04L 63/10; H04L 61/2007; H04L 63/102
See application file for complete search history.

(56) References Cited

U.S. PATENT DOCUMENTS

| | | | | |
|---|---|---|---|---|
| 8,254,382 B1 * | 8/2012 | Wu | ....................... | H04W 48/17 370/465 |
| 8,494,559 B1 * | 7/2013 | Malmi | .................. | H04W 48/20 455/433 |
| 8,644,255 B1 * | 2/2014 | Burcham | .............. | H04W 88/06 370/339 |
| 8,782,741 B1 * | 7/2014 | L'Heureux | ........... | H04L 67/306 726/3 |
| 8,918,051 B1 * | 12/2014 | Chang | ................. | H04W 36/304 455/142 |
| 9,781,696 B1 * | 10/2017 | Soave | ..................... | H04W 4/80 |
| 10,159,029 B2 * | 12/2018 | Ray | ....................... | H04W 24/02 |
| 10,372,931 B2 * | 8/2019 | Rotem | ................ | H04L 63/0227 |
| 10,542,466 B1 * | 1/2020 | Indurkar | ........... | H04W 36/0038 |
| 11,750,613 B2 | 9/2023 | Riviello et al. | | |
| 2004/0068653 A1 * | 4/2004 | Fascenda | .............. | H04W 12/50 713/168 |
| 2008/0043749 A1 * | 2/2008 | Suganthi | ............. | H04L 12/4641 370/395.52 |

(Continued)

*Primary Examiner* — James R Turchen
(74) *Attorney, Agent, or Firm* — BakerHostetler (57) ABSTRACT

Systems and methods are described for on-network device identification. A user device may make an application programming interface (API) call to an address associated with a network device. The API call may comprise an indication of an address associated with the user device. Based on the API call, the network device may send an indication of the address to a computing device associated with an on-network service. The computing device associated with the on-network service may determine that the user device is authorized to connect to a network or to access an on-network service.

28 Claims, 9 Drawing Sheets

(56) References Cited

U.S. PATENT DOCUMENTS

| | | | | |
|---|---|---|---|---|
| 2011/0216726 A1* | 9/2011 | Skog | .................. | H04W 8/26 |
| | | | | 370/329 |
| 2013/0080732 A1* | 3/2013 | Nellans | .............. | G06F 12/0246 |
| | | | | 711/206 |
| 2014/0106705 A1* | 4/2014 | Burcham | ............. | H04W 88/06 |
| | | | | 455/406 |
| 2014/0237594 A1* | 8/2014 | Thakadu | ............... | G06F 21/52 |
| | | | | 726/23 |
| 2015/0089058 A1* | 3/2015 | Hu | .................... | H04L 41/0894 |
| | | | | 709/225 |
| 2015/0163158 A1* | 6/2015 | Ryland | .............. | H04L 41/0894 |
| | | | | 709/225 |
| 2015/0169392 A1* | 6/2015 | MacKay | ............... | G06F 9/541 |
| | | | | 709/217 |
| 2015/0363581 A1* | 12/2015 | Ranadive | ............... | G06F 21/34 |
| | | | | 726/19 |
| 2015/0372999 A1* | 12/2015 | Pi-Sunyer | ............ | H04L 67/535 |
| | | | | 726/4 |
| 2017/0026488 A1* | 1/2017 | Hao | ....................... | H04L 67/60 |
| 2017/0046436 A1* | 2/2017 | Glover | ................. | G06F 16/283 |
| 2017/0111336 A1* | 4/2017 | Davis | ..................... | H04L 67/10 |
| 2017/0208039 A1* | 7/2017 | Godfrey | .................... | G06F 9/00 |
| 2017/0339631 A1* | 11/2017 | Pugaczewski | ....... | H04W 12/06 |
| 2018/0220291 A1* | 8/2018 | Fares | ................. | H04W 12/082 |
| 2018/0232514 A1* | 8/2018 | Brown | ................ | H04L 63/107 |
| 2018/0295405 A1* | 10/2018 | Barnett, Jr. | ........ | H04N 21/4122 |
| 2019/0007834 A1* | 1/2019 | Wang | ................... | H04W 12/06 |
| 2019/0037613 A1* | 1/2019 | Anantharaman | ..... | H04W 12/06 |

* cited by examiner

SYSTEMS AND METHODS FOR ON-NETWORK DEVICE IDENTIFICATION

CROSS REFERENCE TO RELATED APPLICATIONS

This application is a continuation of U.S. application Ser. No. 17/647,609, filed Jan. 11, 2022, now U.S. Pat. No. 11,750,613, which is a continuation of U.S. patent application Ser. No. 16/046,804, filed Jul. 26, 2018, now U.S. Pat. No. 11,252,155, each of which is hereby incorporated by reference in its entirety.

BACKGROUND

A service provider may comprise computing devices, such as servers, in a network for providing on-network services. A subscriber of the service provider may use a user device to connect with the network via a network device at a premises. The user device may have an address. A network device may use a mask preventing a service provider computing device from determining the user device address. It may be beneficial for the service provider computing device to obtain the user device address.

SUMMARY

Systems and methods are described for on-network device identification. An example method may comprise causing a user device to make an application programming interface (API) call to an address associated with a network device. The API call may comprise an indication of an address associated with the user device. The example method may comprise receiving, based on the API call, an indication that the user device is configured to communicate with the network device via a local area network.

BRIEF DESCRIPTION OF THE DRAWINGS

The following drawings show generally, by way of example, but not by way of limitation, various examples discussed in the present disclosure. In the drawings.

DETAILED DESCRIPTION

Systems and methods are described for on-network device identification. A network device may be located at a premises. The network device may comprise any device (e.g., a gateway device, a cable modem, a wireless router, etc.) for connecting user devices (e.g., smart phones, tablets, laptops, computing devices, etc.) within the premises with a network, such as the Internet. The network device may comprise instructions (e.g., a program, software, firmware, etc.) for determining an address (e.g., media access control (MAC) address, local internet protocol (IP) address, etc.) for each user device attached to (e.g., connected to, in communication with, etc.) the network device.

Access to the network via the network device may be provided by a computing device associated with a service provider. The network may comprise service provider computing devices, such as servers. The computing devices may provide on-network services to the network device and/or the user devices located at the premises and attached to the network device. A web application programming interface (API) may provide commands (e.g., calls, actions, etc.) to facilitate communication between the computing devices and the network device and/or the user devices located at the premises and attached to the network device. The web API may not be able to determine an address (e.g., MAC address, local IP address) for a user device attached to the network device. A user device may make an API call to an IP address associated with the network device. The API call may comprise an indication of an address (e.g., MAC address, local IP address) associated with the user device. Based on the API call, the network device may generate a message with an indication that the user device associated with the address in the API call is attached to the network device. The network device may send the generated message to the user device and/or to the computing device.

Figure 1:
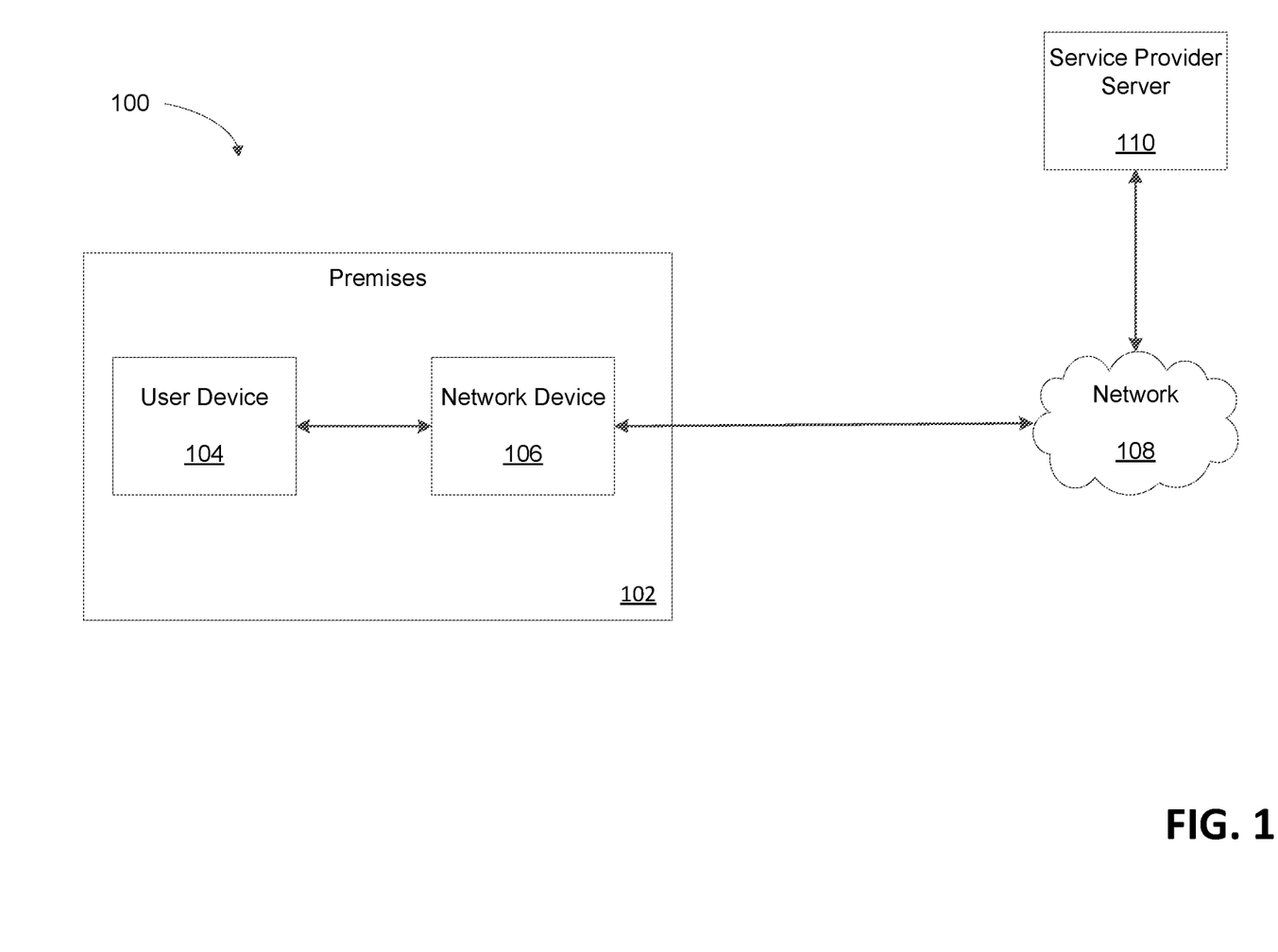
FIG. 1 is a block diagram of an example premises.

FIG. 1 is a block diagram 100 of an example premises 102. The premises 102 may comprise a user device 104 and a network device 106. Although only one user device 104 is shown, the premises 102 may comprise more than one user device 104. Although only one network device 106 is shown, the premises 102 may comprise more than one network device 106.

The user device 104 may comprise a smart phone, a tablet, a laptop, a wearable computing device, or any other appropriate computing device. The user device 104 may be associated with an account (such as a service provider account). The account may be or may not be associated with the premises 102. The account may be associated with a subscription to on-network services. The on-network services may comprise digital content services, such as services providing videos, music, books, images, or text. The on-network services may comprise network connectivity services, such as services that configure the user device 104 to connect to one or more networks. The on-network services may comprise applications, such as mobile applications or other user applications. The on-network services may comprise internet of things services, home automation services, security system services, or premises management services. The on-network services may comprise interfaces, permissions, or configuration of the user-device enabling control of other devices via the user device 104. The on-network services may be associated with or provided by a computing device 110, such as via a network 108. The computing device 110 may be associated with a service provider. The computing device 110 may be associated with one or more on-network services. The computing device 110 may be external to the premises 102. The user device 104 may not be associated with an account or a subscription to on-network services.

The user device 104 may have an associated address (e.g., MAC address, local IP address, etc.). The user device 104 may be in communication with the network device 106. The user device 104 and the network device 106 may communicate using Institute of Electrical and Electronics Engineers (IEEE) 802.11, Bluetooth, or any other communication protocol appropriate for communication between two devices local to the premises 102.

The network device 106 may comprise a cable modem, a wireless router, a gateway device, or any device that provides the premises 102 access to the network 108, such as the Internet. The network device 106 may communicate with other devices, such as a computing device 110 via the network 108. The network device 106 may communicate with the computing device 110 using internet protocol (IP) or any other communication protocol appropriate for communication between two devices communicating over the network 108. The network device 106 may facilitate communication between the user device 104 and the computing device 110. One or more application programming interfaces (APIs) may be used in communications between the user device 104, the network device 106, and the computing device 110.

The computing device 110 may provide the one or more on-network services for one or more user devices 104 attached to the network device 106 at the premises 102. The computing device 110 may use the address associated with the user device 104 to determine that the user device 104 is authorized to access or receive the one or more on-network services.

The computing device 110 may send a prompt message through the network 108 to the network device 106. The network device 106 may forward the prompt message to the user device 104 attached to the network device 106. The prompt message may cause the user device 104 to make an API call to the network device 106. The API call may comprise an indication of the address associated with the user device 104. Based on the API call, the network device 106 may generate an indication that the user device 104 is attached to the network device 106. The indication may comprise an indication of the address associated with the user device 104. The network device 106 may forward the indication of the address to the computing device 110 and/or to the user device 104. The user device 104 may forward the indication of the address to the computing device 110 via the network device 106.

Based on the indication of the address associated with the user device 104, the computing device 110 may determine that the user device 104 is attached to the network device 106. Based on the indication of the address associated with the user device 104, the computing device 110 may determine that the user device 104 is associated with a subscriber of the on-network services. Based on the indication of the address associated with the user device 104 and/or the indication that the user device 104 is attached to the network device 106, the computing device 110 may determine that the user device 104 is located at the premises 102 associated with a subscriber of the on-network services. Based on the determination that the user device 104 is attached to the network device 106, the determination that the user device is associated with a subscriber, and/or the determination that the user device is located at the premises 102, the computing device 110 may determine that the user device 104 is authorized to access one or more of the on-network services.

It may be determined that the user device 104 is authorized to access one or more on-network services based on a profile associated with the user device 104. The profile may indicate one or more on-network services or one or more types of on-network services that the user device 104 is authorized to access. The profile may be determined by a user, such as of the user device 104 or the network device 104. For example, a parent may configure the profile to exclude on-network services that are not intended for children. The profile may be determined by the service provider. For example, the user device 104 may be authorized to access content that is included with a subscription package. The user device 104 may not be authorized to access premium content that is outside the subscription package, unless the user upgrades to a more expansive subscription package. The profile may be determined based on the user device 104 making the API call to the network device, such as by the network device 106 or the network 108.

The computing device 110, may provide the user device 104 with the on-network service, such as via the network 108. The computing device 110 may provide the user device 104 with the on-network service via the network device 106. For example, the computing device 110 may stream a video to the network device 106 and the network device 106 may stream the video to the user device 104.

The computing device 110 may determine to grant a different user device located at a premises associated with the user device 104 access to other devices located at the premises associated with the user device 104. The computing device 110 may determine to grant a different user device located at a premises associated with the user device 104 access to other devices located at the premises associated with the user device 104 based on the determination that the user device 104 is located at the premises 102. The other devices may comprise home automation devices, security system devices, internet of things devices, and/or premises management devices. For example, based on the determination that the user device is located at the premises 102, the computing device 110 may determine that the user device 104 is not located at the home of a user of the user device 104. The user may be traveling and a caretaker may be at the home of the user. The computing device 110 may determine to enable a user device of the caretaker to control home automation devices at the home of the user.

Figure 2:
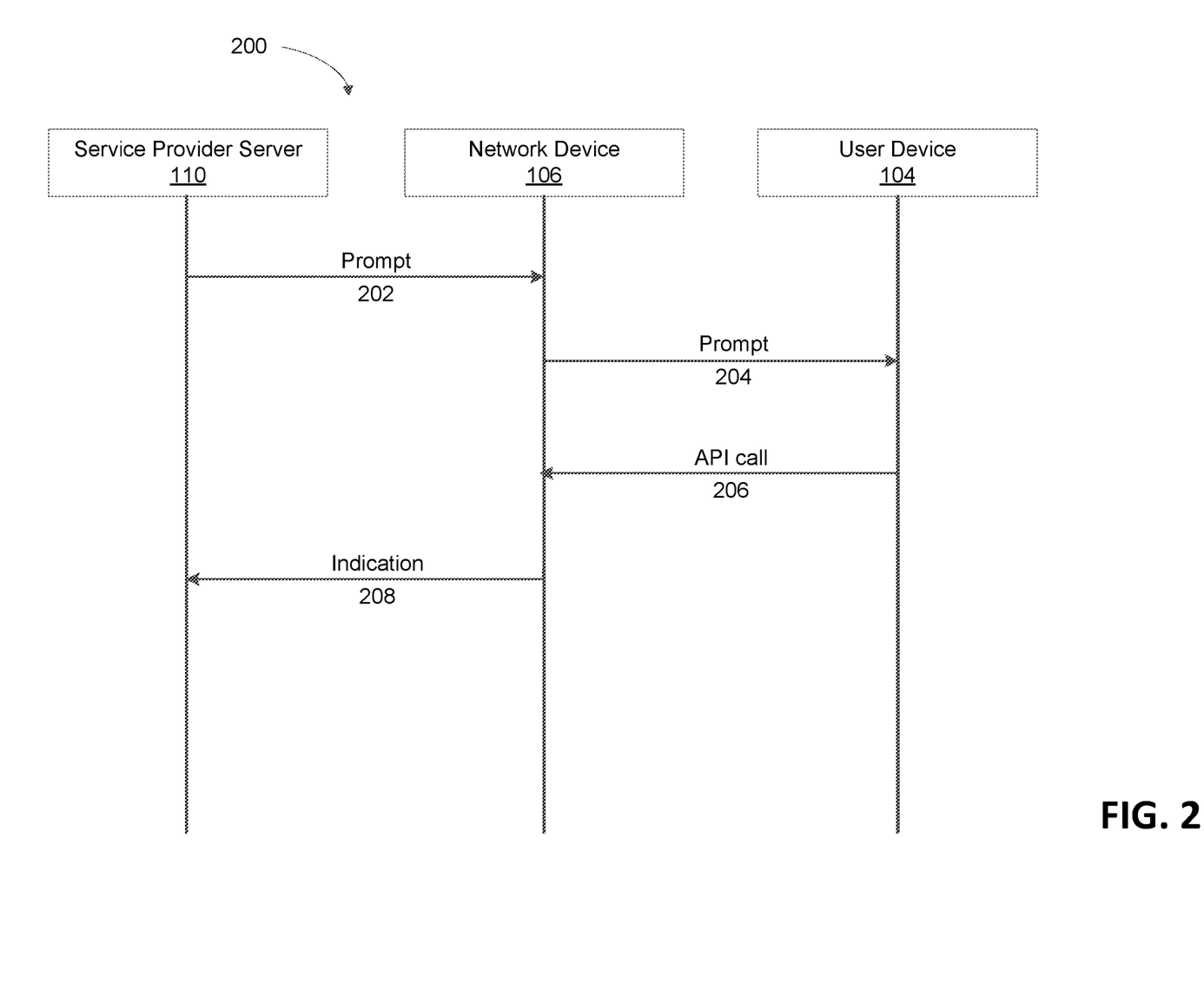
FIG. 2 is an example sequence diagram.

FIG. 2 shows an example sequence diagram 200. At 202, the computing device 110 of FIG. 1 may send a prompt message to the network device 106 of FIG. 1. The prompt message may comprise an indication that the user device 104 requests communication with the network device 106. The prompt message may comprise an indication of an address of the user device 104. The prompt message may comprise an indication that the user device 104 made an API call to the network device 106.

At 204, the network device 106 may forward the prompt message to the user device 104 of FIG. 1. Based on the prompt message, the user device 104 may make an API call to the network device 106 at 206. The API call may comprise an indication of an address (e.g., MAC address, local IP address, etc.) associated with the user device 104. Based on the API call, the network device 106 may generate an indication that the user device 104 is attached to the network device 106. The indication may comprise the address associated with the user device 104. The indication may comprise a profile associated with the user device 104. The profile may indicate one or more on-network services or one or more types of on-network services that the user device 104 is authorized to access. The profile may be determined by a user, such as of the user device 104 or the network device 104. The profile may be determined by the service provider. At 208, the network device 106 may send the indication to the computing device 110.

A content distribution server (e.g., computing device 110 may send, to a gateway device (e.g., network device 106) located a premises (e.g., premises 102), a first prompt message comprising a request for an indication of user devices in communication with the gateway device. Based on the first prompt message, the gateway device may send a second prompt message to a laptop computer (e.g., user device 104) in communication with the gateway device and located at the premises. Based on the second prompt message, the laptop may make an API call to the gateway device comprising an indication of an IP address of the laptop. Based on the API call, the gateway device may send an indication of the IP address of the laptop to the content distribution server.

Based on the indication of the IP address of the laptop, the content distribution server may determine that the laptop is located at the premises with the gateway device and in communication with the gateway device. Based on the determination that the laptop is located at the premises with the gateway device and in communication with the gateway device, the content distribution server may determine that the laptop is authorized to access a content delivery service (e.g., on-network services). Based on the determination that the laptop is authorized to access the content delivery service, the content distribution server may stream content associated with the content delivery service to the laptop.

Figure 3:
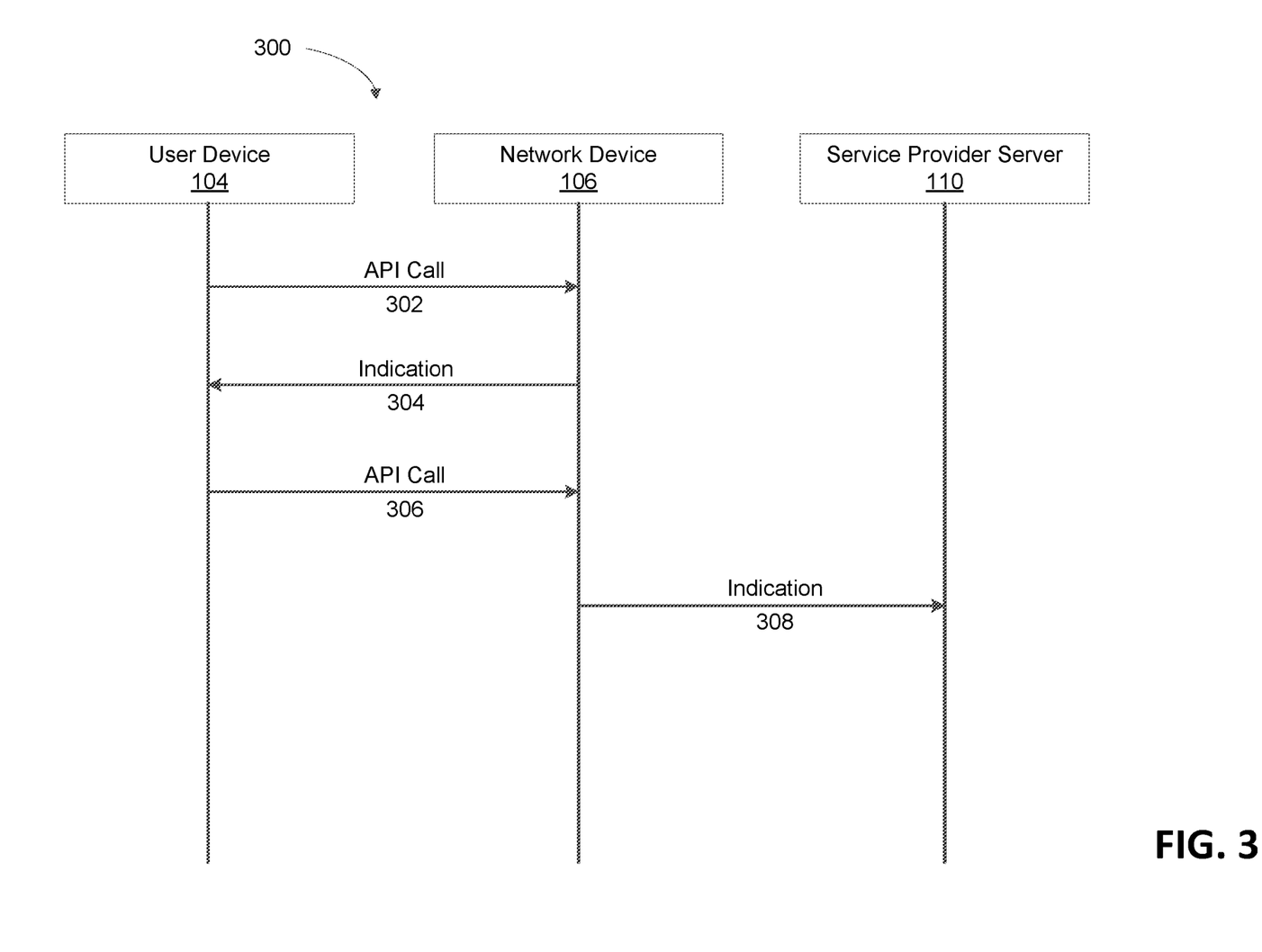
FIG. 3 is an example sequence diagram.

FIG. 3 is an example sequence diagram 300. At 302, the user device 104 of FIG. 1 may make an API call to the network device 106 of FIG. 1. The user device 104 may make the API call in connecting to the network device 106 or in attempting to access on-network services provided by the computing device 110. The API call may comprise an indication of an address (e.g., MAC address, local IP address, etc.) associated with the user device 104.

The network device 106 may generate an indication that the user device 104 is attached to the network device 106, such as based on the API call. The indication may comprise the address associated with the user device 104. At 304, the network device 106 may send the indication to the user device 104. At 306, the user device 104 may make another API call to the network device. The user device 104 may make the API call in requesting access to one or more of the on-network services. At 308, the network device 106 may communicate with the computing device 110, such as based on the other API call. The network device 106 may send an indication of the address associated with the user device 104 to the computing device 110. The network device 106 may send an indication of the request by the user device 104 for the on-network service. The computing device 110 may determine that the user device 104 is authorized to access the on-network service, such as based on the indication sent in 308. The computing device 110 may provide the on-network service.

Additionally or alternatively, a first user may bring a tablet device (e.g., user device 104) to a second user's house (e.g., premises 102). The first user may an input, via the tablet, a selection to connect the tablet to a router (e.g., network device 106) or to a network of the router. The tablet may make an API call to the router, such as based on the selection. The API call may comprise an indication of a MAC address of the tablet. The router may send an indication of the MAC address and/or an indication that the tablet is connected to the router to the computing device 110, such as based on the API call.

Figure 4:
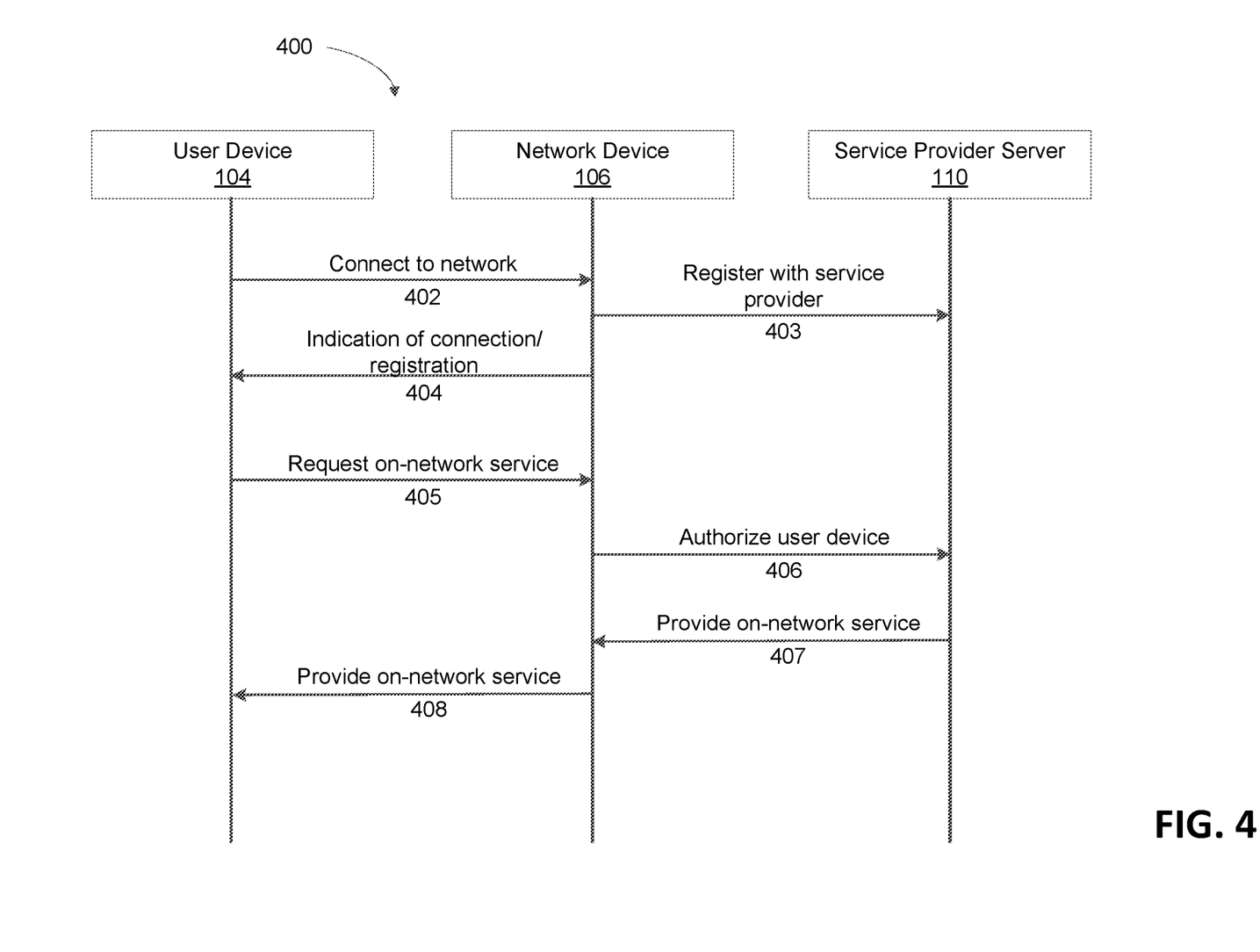
FIG. 4 is an example sequence diagram.

FIG. 4 is an example sequence diagram 400. At 402, the user device 104 of FIG. 1 may make an API call to the network device 106 of FIG. 1. The API call may comprise a request to connect to a network at the premises 102. The API call may comprise an indication of an address (e.g., MAC address, local IP address, etc.) associated with the user device 104.

At 403, the network device 106 may register the user device 104 with a service provider. The network device 106 may register the user device 104 with a service provider based on the API call. The service provider may be associated with the network, such as a provider of the network or a provider of on-network services via the network. The user device 104 may or may not be associated with a subscriber of the service provider. Registering the user device 104 may comprise sending an indication of the address of the user device 104 to the computing device 110. Registering the user device 104 may comprise sending, to the service provider server, an indication that the user device 104 is connected to the network device 106.

The computing device 110 may determine that the user device 104 is associated with a subscriber of the service provider, such as based on the indication of the address. The computing device 110 may determine that the user device 104 is authorized to connect to the network at the premises 102, such as based on the determination that the user device is associated with the subscriber.

Based on the indication that the user device is connected to the network device 106, the service provider server may determine that the user device 104 is located at the premises 102 where the network device is located. Based on the determination that the user device 104 is located at the premises, the computing device 110 may determine that the user device 104 is authorized to connect to the network at the premises 102. The computing device 110 may store an indication of the user device 104, such as the address of the user device 104, in a registry of authorized devices.

At 404, the network device 106 may send, to the user device 104, an indication that the user device is authorized to connect to the network. The network device 106 may send the user device 104 and indication that the user device 104 is registered as an authorized device with the service provider. The network device 106 may send the user device 104 and indication of a profile associated with the user device 104. The profile may be associated with filters, permission, or rules associated with on-network services that the user device 104 is authorized to access. The profile may be determined by the service provider, the computing device 110, the network device 106, or a user of the user device 104.

At 405, the user device 104 may send, to the network device 106, a request to access one or more of the on-network services. The request may comprise an indication of the address of the user device 104. At 406, the network device 106 may send an indication of the request to the computing device 110, such as based on the request. The indication of the request may comprise an indication of the address associated with the user device 104. The indication of the request may comprise an indication of the requested on-network services. The computing device 110 may determine that the user device 104 is authorized to access the requested on-network service, such as based on the indication of the request. Authorizing the user device 104 may comprise determining that the registry of authorized devices comprises the indication of the user device, such as the address associated with the user device. Authorizing the user device 104 may be based on the profile associated with the user device 104.

At 407, the computing device 110 may provide the on-network service to the user device 104. The computing device 110 may provide the on-network service to the user device 104 based on the determination that the user device 104 is authorized to access the requested on-network service. Providing the requested on-network service may comprise storing data or content associated with the requested on-network service at a storage location available to the user device 104. Providing the requested on-network service may comprise sending data or content associated with the requested on-network service to the user device 104 directly or via another device. For example, the service provider server 110 may send the data or content associated with the requested on-network service to the network device 106. At step 408, the network device 106 may send the data or content associated with the requested on-network service to the user device 104.

Figure 5:
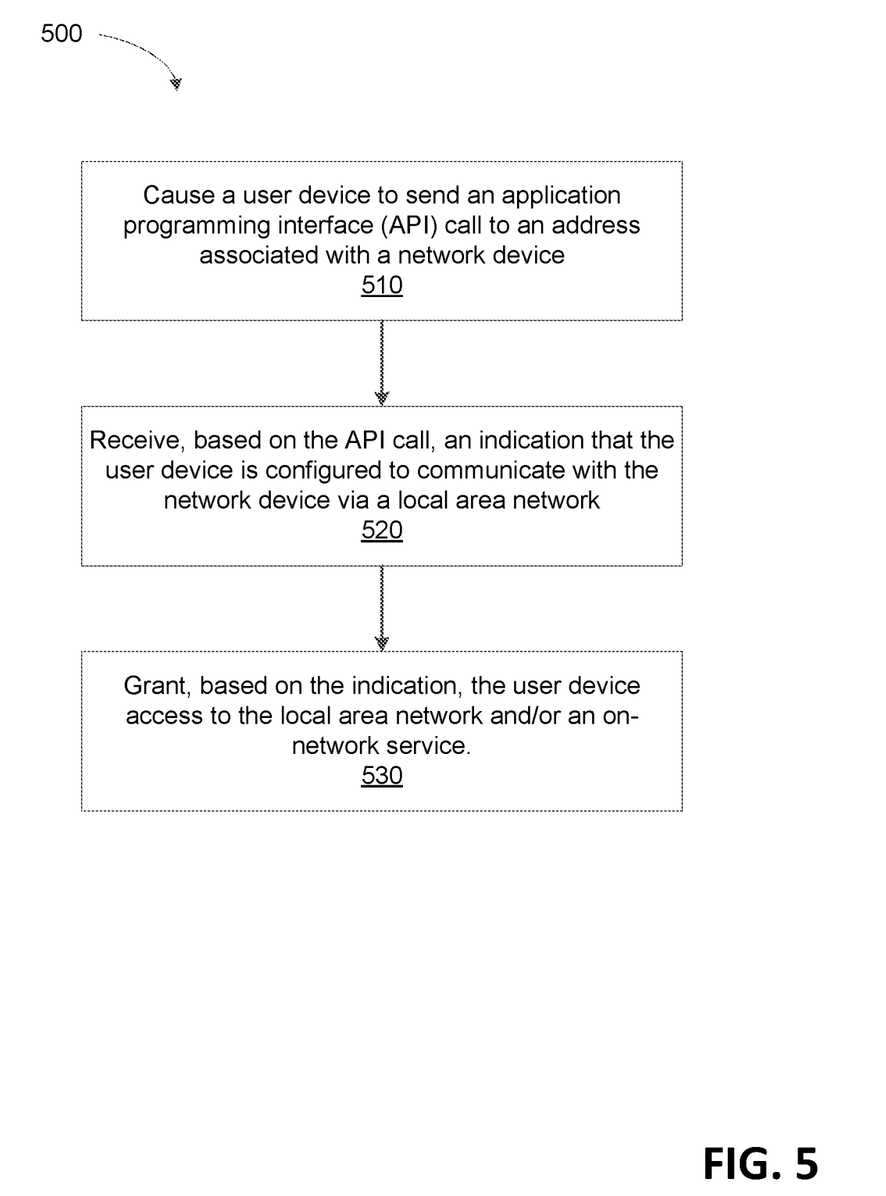
FIG. 5 is a flow diagram of an example method.

FIG. 5 shows an example method 500. At step 510, a user device 104 may be caused to make an application programming interface (API) call to an address associated with a network device 106. The computing device 110 of FIG. 1 may cause the user device 104 of FIG. 1 to make an API call to an address associated with the network device 106 of FIG. 1. A user may cause the user device 104 to make the API call, such as by inputting a selection to connect to a network at the premises 102 or by inputting a selection to access one or more on-network services. The address associated with the network device 106 may comprise an Internet Protocol (IP) address. The network device 106 may comprise a gateway device or a wireless router. The API call may comprise an indication of an address associated with the user device 104. The address associated with the user device 104 may comprise an Internet Protocol (IP) address. The address associated with the user device 104 may comprise a media access control (MAC) address.

At step 520, an indication that the user device 104 is configured to communicate with the network device 106 via a local area network may be received based on the API call. The computing device 110 may receive, based on the API call, an indication that the user device 104 is configured to communicate with the network device 106 via a local area network at the premises 102. The indication that the user device 104 is configured to communicate with the network device 106 via the local area network may be generated based on the address associated with the user device 104. The network device 106 may generate the indication that the user device 104 is configured to communicate with the network device 106 via the local area network based on the address associated with the user device 104.

At step 530, the user device 104 may be granted access to the network at the premises 102. The user device 104 may be granted access to an on-network service. The user device 104 may be granted access to the network at the premises 102 and/or to the on-network service based on the indication that the user device 104 is configured to communicate with the network device 106 via the local area network. The computing device 110 may grant, based on the indication that the user device 104 is configured to communicate with the network device 106 via a local area network, the user device 104 access to an on-network service. The on-network service may comprise a digital content service, a network connectivity service, an application, an internet of things service, a home automation service, a security system service, or a premises management service.

Additionally or alternatively, a user may be a subscriber to a service provider. The user may have a mobile phone (e.g., user device 104). The mobile phone may have an IP address. The service provider may associate the IP address with the mobile phone and/or the subscriber/user. The user may go to a home (e.g., premises 102) of another subscriber of the service provider. The home may comprise a gateway device (e.g., network device 106) configured to connect to a network (e.g., network 108). The mobile phone may connect to the gateway device to access the network. The network may be provided by a computing device associated with a service provider and/or an on-network service (e.g., computing device 110). The computing device may send a prompt to the gateway device. In response, the gateway device may send the prompt to the mobile phone. The prompt may cause the mobile phone to make an API call to an address associated with the gateway device. The API call may comprise an indication of the address associated with the mobile phone. Based on the API call, the gateway device may generate an indication that the mobile phone is attached to the gateway device. The indication may comprise the address associated with the mobile phone. The gateway device may send the indication that the mobile phone is attached to the gateway device to the computing device. Based on the indication that the mobile phone is attached to the gateway device and/or the indication of the address associated with the mobile phone, the computing device may determine that the mobile phone associated with the subscriber is at the house associated with the other subscriber. Based on the determination that the mobile phone associated with the subscriber is at the house associated with the other subscriber, the computing device may provide the mobile phone with an on-network service.

Figure 6:
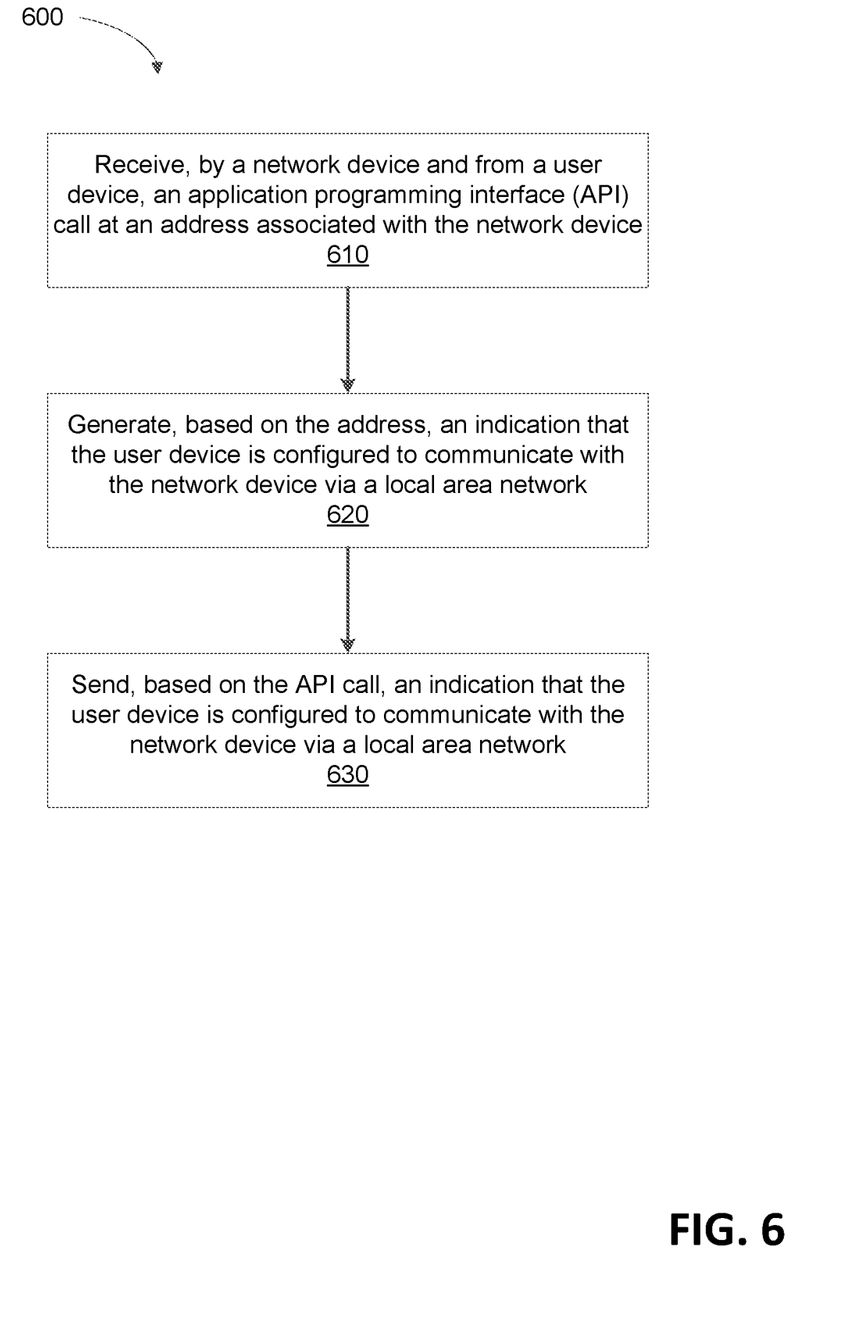
FIG. 6 is a flow diagram of an example method.

FIG. 6 shows an example method 600. At step 610, an application programming interface (API) call may be received by a network device 106, from a user device 104, at an address associated with the network device 106. The address associated with the network device 106 may comprise an Internet Protocol (IP) address. The network device 106 of FIG. 1 may receive, from the user device 104 of FIG. 1, an API call at an address associated with the network device 106. The API call may comprise an indication of an address associated with the user device. The network device 106 may comprise a gateway device or a wireless router. The address associated with the user device 104 may comprise an Internet Protocol (IP) address. The address associated with the user device 104 may comprise a media access control (MAC) address.

At step 620, an indication that the user device 104 is configured to communicate with the network device 106 may be generated. An indication that the user device 104 is configured to communicate with the network device 106 via a local area network may be generated. The indication may be generated based on the address. For example, the indication may be generated based on a determination that the address is associated with a user and/or an account authorized to communicate with the network device 106, communicate via the local area network, and/or access an on-network device. The indication may be generated based on the API call. The indication may be generated by the network device 106.

At step 620, the indication that the user device 104 is configured to communicate with the network device 106 via the local area network may be sent based on the API call. The network device 106 may send, based on the API call, an indication that the user device 104 is configured to communicate with the network device 106 via a local area network to the user device 104 and/or the computing device 110 of FIG. 1. The indication that the user device 104 is configured to communicate with the network device 106 via the local area network may be generated based on the address associated with the user device 104. The network device 106 may generate the indication that the user device 104 is configured to communicate with the network device 106 via the local area network based on the address associated with the user device 104.

For example, a subscriber to a service provider may reside at a premises 102. The premises 102 may comprise a network device 106 configured to connect to a network. The network may comprise a computing device associated with a service provider and/or an on-network service. Another subscriber of the service provider may come to the premises 102. The other subscriber may comprise a user device 104.

The user device 104 may have an address. The service provider may associate the address with the user device 104 and/or the other subscriber. The user device 104 may connect to the network device 106 to access the network. The network device 106 may receive an API call from the user device 104. The API call may comprise an indication of the address associated with the user device 104. The network device 106 may generate an indication that the user device 104 is attached to the network device 106. The indication may comprise the address associated with the user device 104. The network device 106 may send the indication to the computing device 110 and/or the user device 104. Based on the indication that the user device 104 is attached to the network device 106 and/or the indication of the address associated with the user device 104, the computing device 110 may determine that the user device 104 associated with the subscriber is at the premises 102 associated with the other subscriber. Based on the determination that the user device 104 associated with the subscriber is at the premises 102 associated with the other subscriber, the computing device 110 may provide the user device 104 with an on-network service.

Figure 7:
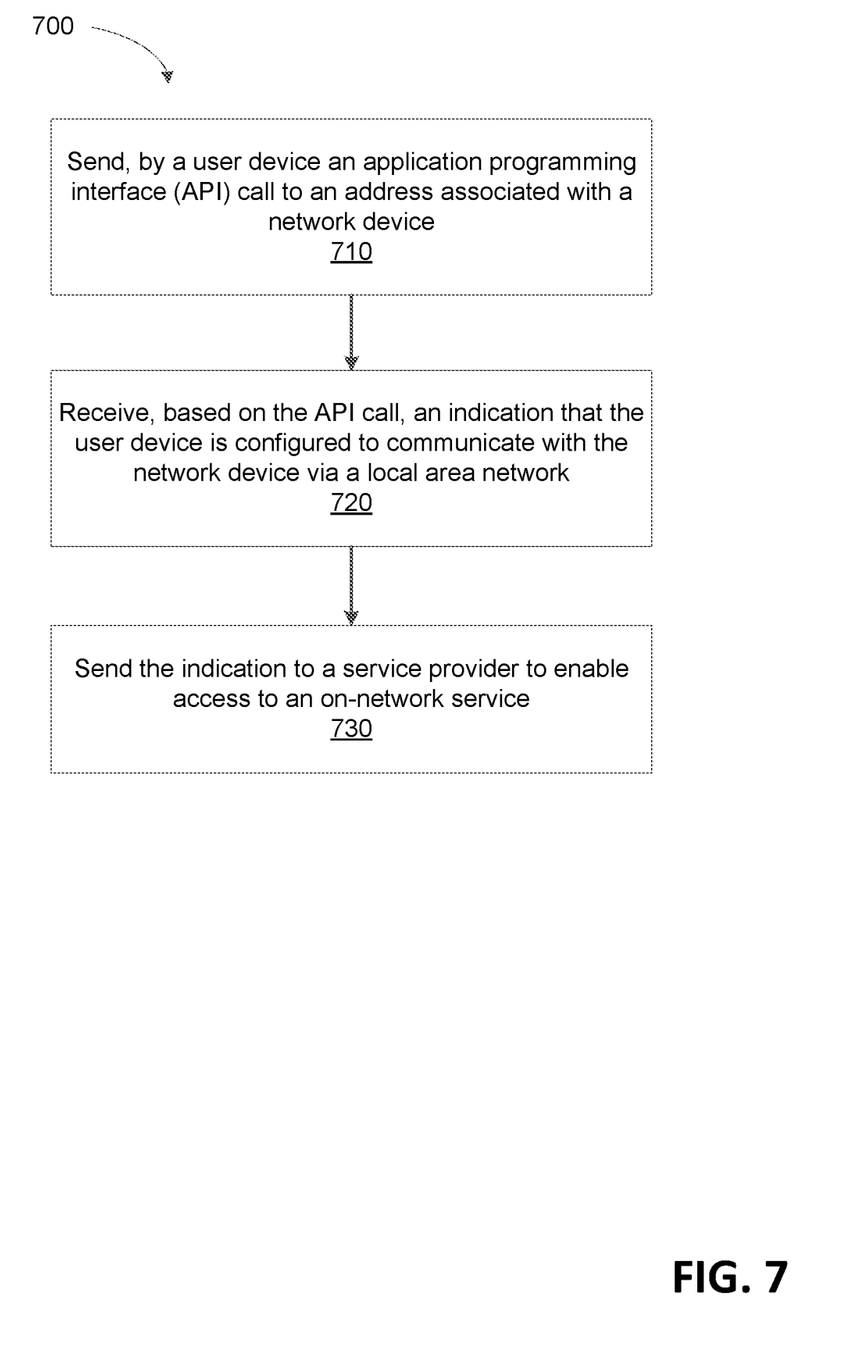
FIG. 7 is a flow diagram of an example method.

FIG. 7 shows an example method 700. At step 710, a user device 104 may make an application programming interface (API) call to an address associated with a network device 106. The address associated with the network device 106 may comprise an Internet Protocol (IP) address. The user device 104 of FIG. 1 may send an API call to an address associated with the network device 106 of FIG. 1. The user device 104 may make the API call to connect to a network at a premises 102. The API call may comprise an indication of an address associated with the user device 104. The network device 106 may comprise a gateway device or a wireless router. The address associated with the user device 104 may comprise an Internet Protocol (IP) address. The address associated with the user device 104 may comprise a media access control (MAC) address.

At step 720, an indication that the user device 104 is configured to communicate with the network device 106 via a local area network may be received based on the API call. The user device 104 may receive, based on the API call, an indication that the user device 104 is configured to communicate with the network device 106 via a local area network. The indication that the user device 104 is configured to communicate with the network device 106 via the local area network may be generated based on the address associated with the user device 104. The network device 106 may generate the indication that the user device 104 is configured to communicate with the network device 106 via the local area network based on the address associated with the user device 104.

An indication of a profile associated with the user device 104 may be received. The profile may indicate one or more on-network services or one or more types of on-network services that the user device 104 is authorized to access. The profile may be determined by a user, such as of the user device 104 or the network device 104. For example, a parent may configure the profile to exclude on-network services that are not intended for children. The profile may be determined by the service provider. The user device 104 may be authorized to access content that is included with a subscription package. The user device 104 may not be authorized to access premium content that is outside the subscription package, unless the user upgrades to a more expansive subscription package. The profile may be determined based on the user device 104 making the API call to the network device, such as by the network device 106 or the network 108.

At step 730, an indication may be sent to a service provider to enable access to an on-network service. The user device 104 may send a request to the computing device 110 of FIG. 1 to enable access to an on-network service. The on-network service may a digital content service, a network connectivity service, an application, an internet of things service, a home automation service, a security system service, or a premises management service.

For example, a user may be a subscriber of a service provider. The user may have a user device 104. The user device 104 may have an address. The service provider may associate the address with the user device 104 and/or the subscriber. The user may go to a premises 102 of another subscriber of the service provider. The premises 102 may comprise a network device 106 configured to connect to a network. The user device 104 may connect to the network device 106 to access the network. The network may comprise a computing device 110. The user device 104 may make an API call to the network device 106. The API call may comprise an indication of the address. The network device 106 may generate an indication that the user device 104 is attached to the network device 106. The indication may comprise the address associated with the user device 104. The network device 106 may send the indication to the user device 104. The user device 104 may send the indication to the computing device 110 via the network device 106. Based on the indication that the user device 104 is attached to the network device 106 and/or the indication of the address associated with the user device 104, the computing device 110 may determine that the user device 104 associated with the subscriber is at the premises 102 associated with the other subscriber. Based on the determination that the user device 104 associated with the subscriber is at the premises 102 associated with the other subscriber, the computing device 110 may provide the user device 104 with an on-network service, such as a content service.

For example, a user of a user device 104 may not be a subscriber of a service provider. Based on a determination that the user device 104 is located at a premises 102 associated with a subscriber or is in communication with a network device 106 associated with a subscriber, the computing device 110 may determine to authorize the user device 104 to connect to a network or to access on-network services. The computing device 110 may determine to authorize the user device 104 to connect to the network or access the on-network services while the user device 104 is at the premises 102 or connected to the network device 106. The computing device 110 may determine that the user device 104 remains at the premises by determining that the user device 104 remains in communication with the network device 106 or by providing the on-network services to the user device 104 via the network device 106.

Figure 8:
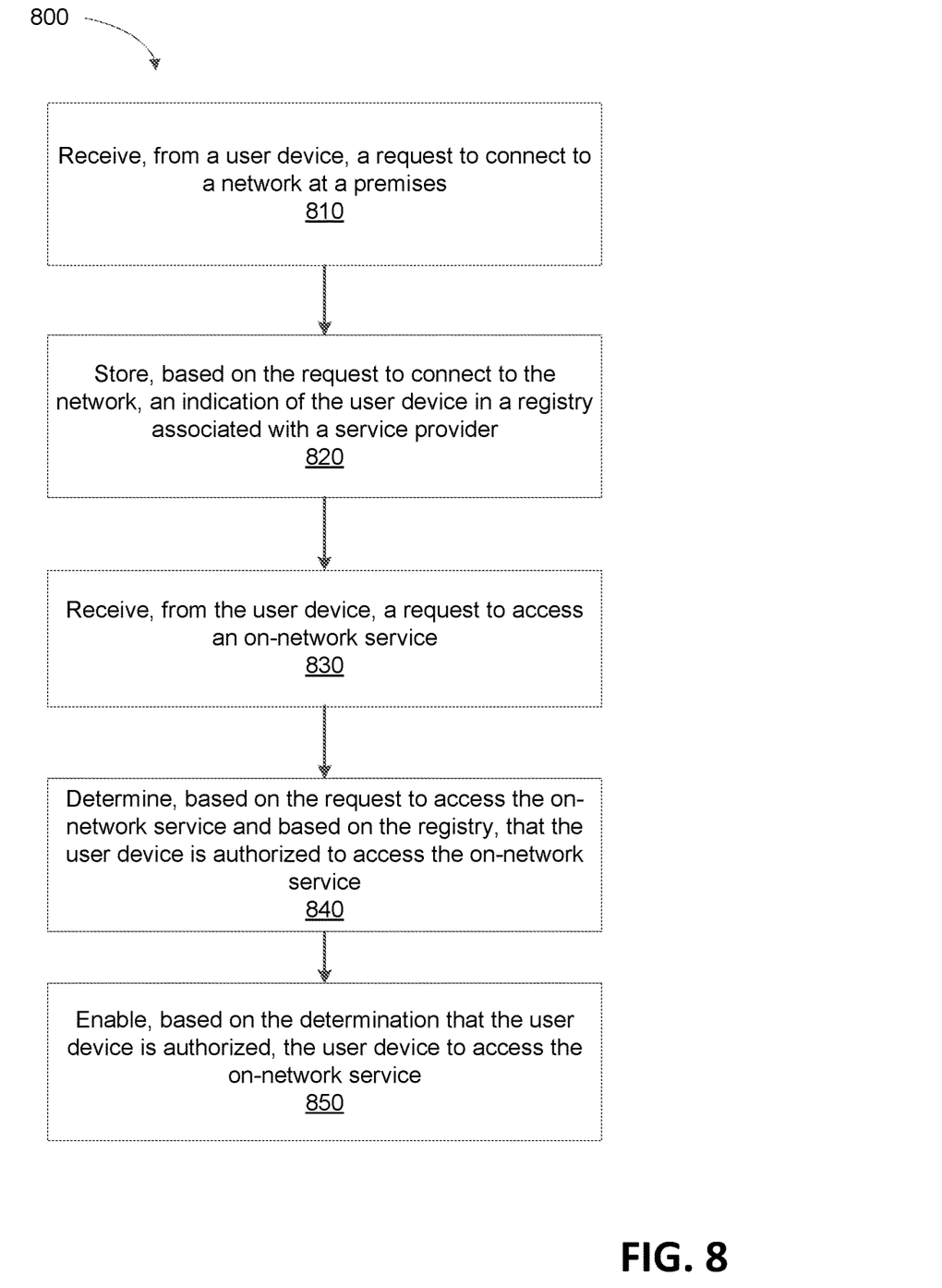
FIG. 8 is a flow diagram of an example method.

FIG. 8 shows an example method 800. At step 810, a request to connect to a network at a premises 102 may be received from a user device 104. The request may comprise an API call, such as to a network device 106. The user device 104 and the network device 106 may be located at the premises 102. The network may comprise a local area network. The request may comprise an address (e.g., MAC address, IP address) associated with the user device 104. The user device may be associated with a subscriber of a service provider. The user device may not be associated with a subscriber of a service provider. For example, the user of a user device may not be a subscriber of a service provider, but may be visiting the house or business of a subscriber of the service provider.

At step 820, based on the request to connect to the network, the network device 106 may send an indication of the request to a computing device 110. The indication may comprise an indication of the address associated with the user device 104. Based on the indication, the computing device 110 may determine that the user device 104 is located at the premises and/or that the user device is in communication with the network device 106. Based on the determination that the user device 104 is located at the premises and/or that the user device is in communication with the network device 106, the computing device 110 may store an indication of the user device 104 in a registry. The registry may be associated with devices authorized to connect to the network and/or devices authorized to access on-network services. The indication of the user device 104 may comprise an indication of the address associated with the user device 104 and/or an indication of a subscriber account associated with the user device 104.

Based on the address associated with the user device 104, the computing device 110 may determine that the user device 104 is associated with a subscriber of a service provider associated with the computing device 110. Based on the determination that the user device 104 is associated with the subscriber of a service provider associated with the computing device 110, the computing device 110 may store the indication of the user device 104 on the registry. Based on one or more of the determination that the user device 104 is located at the premises, the determination that the user device is in communication with the network device 106, and/or the determination that that the user device 104 is associated with a subscriber of a service provider associated with the computing device 110, the computing device 110 may enable the user device 104 to connect to the network. Enabling the user device 104 to connect to the network may comprise sending an indication to the network device 106 to connect to the network or to enable the user device 104 to connect to the network. An indication that the user device 104 is connected to the network and/or to the network device 106 may be send to the user device 104, such as by the network device 106.

A profile associated with the user device 104 may be determined. The profile may indicate one or more on-network services or one or more types of on-network services that the user device 104 is authorized to access. The profile may be determined by a user, such as of the user device 104 or the network device 104. For example, a parent may configure the profile to exclude on-network services that are not intended for children. The profile may be determined by the service provider. The user device 104 may be authorized to access content that is included with a subscription package. The user device 104 may not be authorized to access premium content that is outside the subscription package, unless the user upgrades to a more expansive subscription package. An indication of the profile may be stored, such as to the registry. An indication of the profile may be sent to the user device 104, such as by the network device 106 or the computing device 110.

At step 830, a request may be received, from the user device, to access one or more on-network services. The on-network services may comprise digital content services, network connectivity services, mobile applications, internet of things services, home automation services, security system services, or premises management services. The request may comprise an indication of the address associated with the user device 104. The request may comprise an API call to the network device 106.

At step 840, based on the request to access the on-network services, the network device 106 may send an indication of the request to the computing device 110. The indication of the request may comprise an indication of the services. The indication of the request may comprise an indication of the address associated with the user device 104.

Based on the indication of the request, the computing device 110 may determine whether the user device 104 is authorized to access the on-network services. The computing device 110 may determine that the registry comprises the indication of the user device 104. Based on the determination that the registry comprises the indication of the user device 104, the computing device 110 may determine that the user device is authorized to access the on-network services. The computing device 110 may determine whether the user device 104 is authorize to access the requested on-network services based at least on the profile associated with the user device 104. The computing device 110 may determine whether the user device 104 is authorize to access the requested on-network services based at least on a subscription of a user of the user device 104.

At step 850, based on the determination that the user device 104 is authorized to access the requested on-network services, the requested on-network services may be provided to the user device 104, such as by the computing device 110. Providing the requested on-network service may comprise storing data or content associated with the requested on-network service at a storage location available to the user device 104. Providing the requested on-network service may comprise sending data or content associated with the requested on-network service to the user device 104 directly or via another device. For example, the computing device 110 may send the data or content associated with the requested on-network service to the network device 106. At step 408, the network device 106 may send the data or content associated with the requested on-network service to the user device 104.

Figure 9:
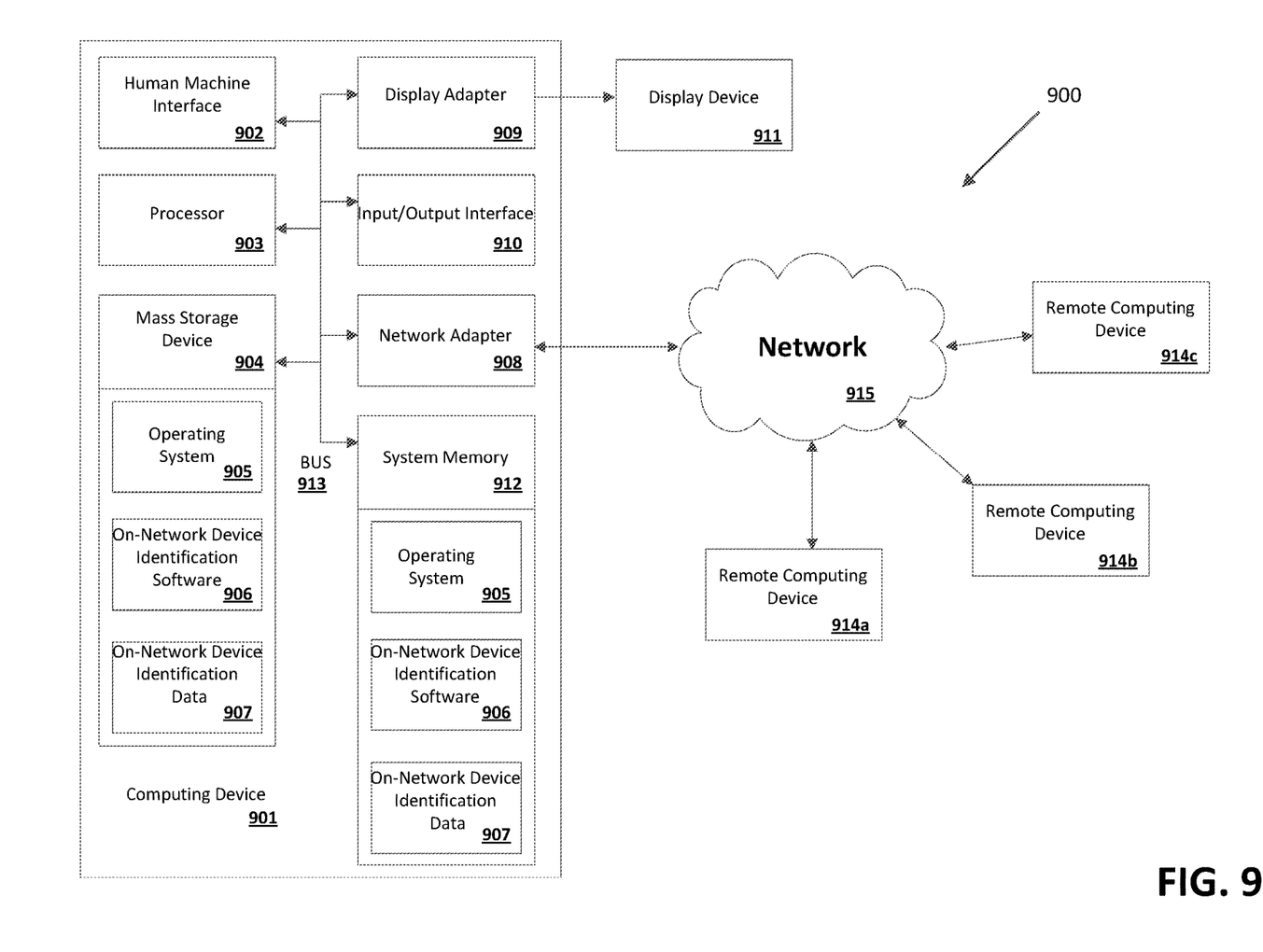
FIG. 9 is a block diagram of an example system environment.

FIG. 9 shows an example operating environment 900. The example operating environment 900 is not intended to suggest any limitation as to the scope of use or functionality of operating environment architecture. Neither should the operating environment be interpreted as having any dependency or requirement relating to any one or combination of components shown in the example operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, and mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Additionally or alternatively, the systems and methods disclosed may be implemented via a general-purpose computing device in the form of a computing device 901. The components of the computing device 901 may comprise, but are not limited to, one or more processors or processing units 903, a system memory 912, and a system bus 913 that couples various system components including the processor 903 to the system memory 912. In the case of multiple processing units 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may be implemented over a wired or wireless network connection and each of the subsystems, including the processor 903, a mass storage device 904, an operating system 905, on-network device identification software 906, on-network device identification data 907, a network adapter 908, system memory 912, an Input/output Interface 910, a display adapter 909, a display device 911, and a human machine interface 902, may be contained within one or more remote computing devices 914a,b,c at physically separate locations, connected through buses of this form, in effect implementing a fully distributed system.

The computing device 901 typically comprises a variety of computer readable media. Example readable media may comprise any available media that is accessible by the computing device 901 and may comprise both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as on-network device identification data 907 and/or program modules such as operating system 905 and on-network device identification software 906 that are immediately accessible to and/or are presently operated on by the processing unit 903.

The computing device 901 may comprise other removable/non-removable, volatile/non-volatile computer storage media. By way of example, FIG. 9 shows a mass storage device 904 which may provide non-volatile storage of computer code, computer readable instructions, data structures, program modules, and other data for the computing device 901. For example and not limitation, a mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, an operating system 905 and on-network device identification software 906. Each of the operating system 905 and on-network device identification software 906 (or some combination thereof) may comprise elements of the programming and the on-network device identification software 906. On-network device identification data 907 may be stored on the mass storage device 904. On-network device identification data 907 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 901 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 903 via a human machine interface 902 that is coupled to the system bus 913, but may be connected by other interface and bus structures, such as a parallel port, game port, an IEEE 1394 Port (also known as a Firewire port), a serial port, or a universal serial bus (USB).

A display device 911 may be connected to the system bus 913 via an interface, such as a display adapter 909. It is contemplated that the computing device 901 may have more than one display adapter 909 and the computer 901 may have more than one display device 911. For example, a display device may comprise a monitor, an LCD (Liquid Crystal Display), or a projector. In addition to the display device 911, other output peripheral devices may comprise components such as speakers (not shown) and a printer (not shown) which may be connected to the computing device 901 via Input/Output Interface 910. Any step and/or result of the methods may be output in any form to an output device. Such output may comprise any form of visual representation, including, but not limited to, textual, graphical, animation, audio, tactile, and the like. The display 911 and computing device 901 may comprise part of one device, or separate devices.

The computing device 901 may operate in a networked environment using logical connections to one or more remote computing devices 914a,b,c. By way of example, a remote computing device may comprise a personal computer, portable computer, a smart phone, a server, a router, a network computer, a peer device or other common network node. Logical connections between the computing device 901 and a remote computing device 914a,b,c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

For example, application programs and other executable program components such as the operating system 905 are shown herein as discrete blocks, although such programs and components may reside at various times in different storage components of the computing device 901, and may be executed by the data processor(s) of the computer. An implementation of on-network device identification software 906 may be stored on or sent across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   sending, by a computing device of a service provider that provides at least one service, to a network device located at a premises, a request configured to cause the network device to cause a device located at the premises to send, to the network device, an indication that the device is configured to communicate with the network device at the premises, wherein the premises is associated with a user account that is authorized to access the at least one service;
   receiving, from the network device, the indication;
   based on the indication, determining that the device is located at the premises; and
   based on determining that the device is located at the premises, granting the device access to the at least one service.

2. The method of claim 1, wherein sending the request comprises sending, to the network device, a first prompt message that causes the network device to send a second prompt message to the device, the first prompt message comprising at least in part the request for an indication of devices in communication with the network device.

3. The method of claim 1, wherein the indication comprises an address associated with the device.

4. The method of claim 1, wherein the indication indicates that the device is connected to the network device via a local area network.

5. The method of claim 1, further comprising sending, based on the granting the device access to the at least one service, to the network device, content associated with the at least one service to cause the network device to forward the content associated with the at least one service to the device.

6. The method of claim 1, further comprising storing, based on the granting the device access to the at least one service, in a memory associated with the computing device, data indicating that the device is authorized to access the at least one service.

7. The method of claim 6, wherein the indication includes an address associated with the device, further comprising:
   determining, by the computing device, that the address associated with the device corresponds to the stored data.

8. An apparatus comprising:
   one or more processors; and
   memory storing instructions that, when executed by the one or more processors, cause the apparatus to:
   send, to a network device located at a premises, a request configured to cause the network device to cause a device located at the premises to send, to the network device, an indication that the device is configured to communicate with the network device at the premises, wherein the premises is associated with a user account that is authorized to access at least one service;
   receive, from the network device, the indication;
   based on the indication, determine that the device is located at the premises; and
   based on determining that the device is located at the premises, grant the device access to the at least one service.

9. The apparatus of claim 8, wherein the instructions that cause the apparatus to send the request further cause the apparatus to send, to the network device, a first prompt message that causes the network device to send a second prompt message to the device, the first prompt message comprising at least in part the request for an indication of devices in communication with the network device.

10. The apparatus of claim 8, wherein the indication comprises an address associated with the device.

11. The apparatus of claim 8, wherein the indication indicates that the device is connected to the network device via a local area network.

12. The apparatus of claim 8, wherein the instructions, when executed by the one or more processors, further cause the apparatus to send, based on the granting the device access to the at least one service, to the network device, content associated with the at least one service to cause the network device to forward the content associated with the at least one service to the device.

13. The apparatus of claim 8, wherein the instructions, when executed by the one or more processors, further cause the apparatus to store, based on the granting the device access to the at least one service, in a memory associated with the apparatus, data indicating that the device is authorized to access the at least one service.

14. The apparatus of claim 13, wherein the indication includes an address associated with the device, wherein the instructions, when executed by the one or more processors, further cause the apparatus to:
    determine that the address associated with the device corresponds to the stored data.

15. A non-transitory computer-readable medium storing instructions that, when executed, cause:
    by a computing device of a service provider that provides at least one service, to a network device located at a premises, a request configured to cause the network device to cause a device located at the premises to send, to the network device, an indication that the device is configured to communicate with the network device at the premises, wherein the premises is associated with a user account that is authorized to access the at least one service;
    receiving, from the network device, the indication;
    based on the indication, determining that the device is located at the premises; and
    based on determining that the device is located at the premises, granting the device access to the at least one service.

16. The non-transitory computer-readable medium of claim 15, wherein the instructions that, when executed, cause the causing sending the request to further cause the device to send, to the network device, a first prompt message that causes the network device to send a second prompt message to the device, the first prompt message comprising at least in part the request for an indication of devices in communication with the network device.

17. The non-transitory computer-readable medium of claim 15, wherein the indication comprises an address associated with the device.

18. The non-transitory computer-readable medium of claim 15, wherein the indication indicates that the device is connected to the network device via a local area network.

19. The non-transitory computer-readable medium of claim 15, wherein the instructions, when executed, further cause sending, based on the granting the device access to the at least one service, to the network device, content associated with the at least one service to cause the network device to forward the content associated with the at least one service to the device.

20. The non-transitory computer-readable medium of claim 15, wherein the instructions, when executed, further cause storing, based on the granting the device access to the at least one service, in a memory associated with the computing device, data indicating that the device is authorized to access the at least one service.

21. The non-transitory computer-readable medium of claim 20, wherein the indication includes an address associated with the device, wherein the instructions, when executed, further cause:
determining, by the computing device, that the address associated with the device corresponds to the stored data.

22. A system comprising:
a network device located at a premises and configured to:
receive, from a device, an indication that the device is configured to communicate with the network device at the premises, and
send, to a computing device, the indication; and
the computing device configured to:
send, to the network device located at the premises, a request configured to cause the network device to cause a device located at the premises to send, to the network device, the indication, wherein the premises is associated with a user account that is authorized to access at least one service,
receiving, from the network device, the indication,
based on the indication, determine that the device is located at the premises, and
based on determining that the device is located at the premises, grant the device access to the at least one service.

23. The system of claim 22, wherein the computing device configured to send the request is further configured to send, to the network device, a first prompt message that causes the network device to send a second prompt message to the device, the first prompt message comprising at least in part the request for an indication of devices in communication with the network device.

24. The system of claim 22, wherein the indication comprises an address associated with the device.

25. The system of claim 22, wherein the indication indicates that the device is connected to the network device via a local area network.

26. The system of claim 22, wherein the computing device is further configured to send, based on the granting the device access to the at least one service, to the network device, content associated with the at least one service to cause the network device to forward the content associated with the at least one service to the device.

27. The system of claim 22, wherein the computing device is further configured to store, based on the granting the device access to the at least one service, in a memory associated with the computing device, data indicating that the device is authorized to access the at least one service.

28. The system of claim 27, wherein the indication includes an address associated with the device, wherein the computing device is further configured to:
determine that the address associated with the device corresponds to the stored data.

\* \* \* \* \*